3,494,975
AQUEOUS WASTE DISPOSAL IN PROCESS FOR PREPARATION OF ISOPRENE FROM ISOBUTYLENE
Walter Krönig and Wulf Schwerdtel, Leverkusen, Hans-Walther Brandt, Cologne-Flittard, and Bruno Engelhard, Cologne-Stammheim, Germany, assignors to Farbenfabriken Bayer Aktiengesellschaft, Leverkusen, Germany, a corporation of Germany
No Drawing. Filed Dec. 29, 1967, Ser. No. 694,385
Claims priority, application Germany, Jan. 2, 1967,
F 51,156
Int. Cl. C07c *1/00, 1/20*
U.S. Cl. 260—681                                                    12 Claims

ABSTRACT OF THE DISCLOSURE

Increasing yield of isoprene in a process by which isobutene and aqueous formaldehyde are catalytically reacted to form 4,4-dimethyl-m-dioxane-containing hydrocarbon phase and by-product-containing aqueous phase, with subsequent catalytic decomposition of said dioxane to form isoprene, wherein such aqueous phase is recovered and concentrated, e.g. by evaporating at least a part of the water content, and then the by-product residue upon concentration decomposed to isoprene, optionally together with the decomposition of said dioxane, and optionally with prior recovery from said aqueous phase of readily volatile components by distillation or extraction and/or recovery of volatile constituents from the evaporated portion of said aqueous phase (upon such concentration) by extraction.

This invention relates to a process for the preparation of isoprene.

It is known that isoprene can be prepared from isobutene and formaldehyde by reacting isobutene, or hydrocarbon fractions which contain isobutene, with aqueous formaldhyde in a first stage in the presence of an acid catalyst to form 4,4-dimethyl-m-dioxane, and splitting this in a second stage at an elevated temperature in the presence of acid catalysts into isoprene and formaldhyde, the liberated formaldehyde being returned to the first reaction stage. It has been found advantageous to use acid cation exchangers as catalysts in the first stage.

In the reaction in the first stage, certain amounts of water-soluble, glycol-type compounds are formed amongst others in addition to the desired 4,4-dimethyldioxane. The amount of these by-products is strongly dependent on the reaction conditions; it may, for example, amount to from 5 to 35 parts by weight of water-soluble, high-boiling products for every 100 parts by weight of dioxane formed. The formation of these by-products constitutes a considerable loss since not only isobutene but substantial amounts of formaldehyde have been used up for their formation and are therefore no longer available for the desired formation of dimethyldioxane. In addition, these water-soluble, polyglycol type products render the process more difficult because the aqueous solution which may contain these by-products in amounts, e.g., of 3 to 20% by weight must be removed as waste water from the process, and the high polyglycol content of this waste water is a considerable burden on the process of working up the waste water.

We have now found that the preparation of isoprene by reacting isobutene with aqueous formaldhyde in the presence of a catalyst to form 4,4-dimethyl-m-dioxane and splitting this to form isoprene can be carried out much more advantageously if the by-products, less volatile than water, formed in the production of dimethyldioxane and dissolved in the aqueous phase are catalytically decomposed into isoprene after they have been concentrated.

To concentrate the polyglycols in the waste water, it is advantageous firstly to remove the acid catalyst contained in the waste water. Mechanical separation, for example, by filtration, decanting, centrifuging or a combination of these measures is suitable in cases where solid catalysts are used.

Concentration of the by-products may be achieved, for example, by evaporating off the water in which they are dissolved. It is generally not necessary to evaporate the water off completely. Evaporation may, if desired, only be continued until the residue of polyglycol type substances contains about 5 to 50% by weight of water. It has been found advantageous to carry out the evaporation of water at least partly under reduced pressure, and here again it is especially advantageous to carry out the evaporation in several successive stages of progressively decreasing pressure. For example, three evaporation stages may be employed as follows: the first at about normal pressure, the second at about 400 mm. Hg and the third at about 200 mm. Hg. In this procedure, it is very advantageous to use the heat contained in the vapours from the higher pressure stages for supplying the heat of evaporation in the lower pressure stages.

In addition to the above-mentioned polyglycol type compounds, the waste water frequently also contains more volatile products. It may thus be advantageous to drive off these more volatile products, mainly dimethyldioxane, tertiary butanol, methanol, methylal, etc., by preliminary distillation from the waste water before the waste water itself is vaporated. The preliminary distillation may equally well be replaced by extraction with solvents. Suitable solvents for this purpose are, among others, the isobutene-containing $C_4$ hydrocarbons which are used for the reaction with formaldehyde. The distillates or extracts obtained can be returned in a suitable manner to the appropriate stages of isoprene preparation. If the above-maintained $C_4$-carbons are used as extraction agents, the solution of extracted products in the $C_4$ hydrocarbons may be introduced directly into the reaction with formaldehyde.

In the course of evaporation of water from the polyglycol-containing waste water, a certain amount of decomposition of the polyglycol-containing products with formation of volatile products may occur, and these volatile products may then again be condensed with the water that has been distilled off. Now, it is frequently advantageous not to discharge this distillate as such but firstly to subject it to extraction with isobutene-containing $C_4$ hydrocarbons, and then to introduce the charged $C_4$ hydrocarbons into the process for the preparation of dimethyldioxane. The volatile compounds are thereby recovered, and the waste water to be removed is further purified.

It has proved useful to add the distillate from the evaporation of the polygylcol-containing waste water instead of fresh steam to the catalytic decomposition of 4,4-dimethyl-m-dioxane to isoprene. The amount of waste water which finally has to be removed is considerably reduced by circulating the water in this way. One advantageous embodiment consists in that the vapours from the evaporation of waste water are used directly for decomposition of dioxane; since the decomposition generally takes place at a slightly higher pressure than the evaporation, it is necessary to compress the water-vapors. It has been found that with this distillate there is no difficulty in heating up the vapours to or above the reaction temperature.

The organic substance obtained as evaporation residue in the distillation of the polyglycol-containing waste water is advantageously used, together with 4,4-dimethyl-1,3-dioxane, for the decomposition into isoprene. Known catalysts such as have already been proposed for the decomposition of 4,4-dimethyl-1,3-dioxane, especially catalysts which contain phosphoric acid, for example phosphoric acid or acid phosphates on carriers such as silicic acid or silicates have also proved satisfactory for the decomposition of this evaporation residue either alone or with dioxane. Suitable phosphates are alkali metal and alkaline earth metal phosphates, zinc phosphate, aluminum phosphate, boron phosphate etc. Small quantities of phosphoric acid, e.g. 100 to 1000 p.p.m. of phosphoric acid based on the amount of organic substance used, may be added continuously or intermittently to the reactant. The hosphoric acid may be added as such or in the form of organic derivatives, e.g. alkyl or aryl phosphates. One preferred method of procedure, also when these polyglycol-containing evaporation residues are used, is that of working in a fluidized bed in which the catalyst is preferably introduced in the form of spherical particles generally between 0.2 and 3 mm., and preferably between 0.5 and 2 mm., in diameter. It has been found advantageous to use catalyst layers of about 0.5 to 1.5 m. in height for reacting the mixture of dioxane and evaporation residue, and to subdivide the reaction chamber by suitable shaped baffle plates. Minor quantities of higher boiling compounds up to coke-like compounds are formed in the course of the reaction, become deposited on the surface of the catalyst particles and diminish the catalytic activity. The catalyst should therefore be freed from the deposits by oxidation with air at about 400 to 700° C., preferably 500 to 650° C. For this purpose, the catalyst is advantageously removed from the lower end of the reaction chamber and freed from occluded volatile compounds by stripping it with steam and returning these compounds into the reaction zone with the steam. The catalyst removed from the reaction chamber is then introduced into a regeneration apparatus where it is treated with oxygen-containing gases, mainly air, at the above-mentioned temperature. The regenerated catalyst may then be returned to the reaction chamber, if desired after lowering its temperature thereof, the catalyst cycle being thus closed. The amount of catalyst carried in the cycle may, for example, be from 5 to 50 times the amount of the mixture of dioxane and evaporation residue put into the reaction during the same length of time. The decomposition is generally carried out at atmospheric pressure but a slight excess of pressure or vacuum may also be employed. Decomposition may also be carried out with the addition of steam, e.g. in quantities of from 0.2 to 1.5 parts by weight of steam to 1 part by weight of organic substance introduced into the decomposition reaction. The decomposed evaporation residue provides isoprene yields of about 10 to 50% by weight of the amount of evaporation residue put into the reaction.

In a preferred method of reacting isobutene with formaldehyde to form 4,4-dimethyl-1,3-dioxane, an isobutene-containing $C_4$ fraction is put into the reaction, the isobutene content being preferably 20 to 70% by weight. The formaldehyde is advantageously introduced in aqueous solution at concentrations of 20 to 60% by weight. It is advantageous to employ a molar ratio of isobutene to formaldehyde (both calculated as 100%) of 1:0.5 to 1:2. As catalysts for this reaction one may, for example, use cationic exchangers which contain sulphonic acid groups and which are based on cross-linked, vinyl aromatic polymers, and catalyst concentrations of from 2 to 20 parts by weight, based on the aqueous phase, may be employed in the reaction chamber. The reaction is advantageously carried out in the liquid phase with stirring at appropriate pressures of about 10 to 30 atmospheres at temperatures of 70 to 130° C., preferably 100 to 120° C. After the reaction is terminated, the hydrocarbon-containing phase is separated from the aqueous phase and the aqueous, catalyst-containing phase is then worked up as described above.

EXAMPLE

The following materials were introduced per hour into an autoclave of 20 litres capacity equipped with a stirrer:

15 kg. of a hydrocarbon fraction which contains the following $C_4$ hydrocarbons:
    45% by weight isobutene
    40% by weight of n-butenes
    15% by weight of butanes; and, in addition,
15 kg. of a 30% aqueous formaldehyde solution which contains 1 kg. of catalyst (calculated on the dry weight).

The catalyst was an acid cation-exchanger sulphonated with oleum. It was based on polystyrene cross-linked with 2% by weight of divinylbenzene and had a particle size of from 100 to 600μ. An operating temperature of 110° C. and a pressure of 23 excess atmospheres were employed. The reaction products leaving the reaction chamber were cooled to 50° C. and are separated in a separator into the aqueous phase containing the catalyst and a phase containing the hydrocarbons. The unreacted $C_4$ hydrocarbons contained in the hydrocarbon phase were removed by distillation. The distillation residue (7.65 kg.) which consisted of 70% of 4,4-dimethyl-m-dioxane, 15% of tertiary butanol and 15% of enol-type products served as a starting material for the catalytic decomposition into isoprene.

The catalyst was separated from the aqueous phase in a decanting apparatus. The solid material leaving the decanter was taken up in the formaldehyde solution put into the reaction and returned with this solution to the reaction chamber. The aqueous solution freed from solid was extracted in a countercurrent extractor with the $C_4$-stream which was then used in the reaction vessel described.

The extracted waste water was now concentrated by evaporation in three stages, a pressure of 760 mm. Hg being employed in the first stage, 400 mm. Hg in the second stage and 200 mm. Hg in the third stage. The sump temperatures in the three evaporation stages were 100° C., 84° C. and 71° C., respectively. The proportion of water evaporated in each of these three stages was 25% based on the amount of crude waste water put into the first stage. The steam obtained from the first evaporation stage was concentrated after it had been superheated to 150° C. at 2.5 excess atmospheres, and it was then introduced into the reactor for the catalytic decomposition of dioxane, where it replaced a corresponding quantity of fresh steam. The steam from the two other stages was condensed and removed from the system.

25% by weight of a dark yellow, viscous evaporation residue which contained 85% of organic substance (the remainder being water) was obtained (based on the amount of crude waste water put into the operation). The amount of organic substance was 2 kg./h. The organic substance had a molecular weight of 190 and the following analysis of elements: 57.5% C., 9.5% H and 31.2% O.

The evaporation residue containing 2 kg. of organic substance was combined with the crude dioxane (7.65 kg.) obtained in the preparation of dioxane after the removal of the $C_4$ hydrocarbons by evaporation. The mixture was introduced into the reaction mixture for the catalytic decomposition into isoprene. The catalyst used was silicic acid in the form of spherical particles of from 0.5 to 1.5 mm. in diameter which contained 10% of phosphoric acid. The temperature of the reactor was 325° C. and atmospheric pressure was employed.

1.1 kg. of steam per kg. of organic substance used was added to the reaction mixture. 1.2 kg. of organic starting materials in the form of liquid per litre of reaction chamber were introduced per hour into the reaction chamber and evaporated there by the steam introduced. The reactants moved upwards through the fluidized catalyst layer and left the reaction chamber. They were cooled to room temperature. The catalyst was circulated through the reactor in a downward stream in a quantity of 5 kg./kg. of organic starting material. In the course of its circulation, the catalyst was regenerated with air at 650° C. and returned to the top of the reaction chamber after it had been cooled.

9.65 kg. of water-free organic substance introduced into the reaction chamber yielded 2.325 kg. of isoprene in a single passage through the reaction chamber. When, for comparison only, crude dioxane was used in the said quantity of 7.65 kg., the isoprene yield was 1.885 kg. The isoprene yield was thus increased by 0.44 kg. (=23%) by the use of the polyglycol type substance from the waste water.

What we claim is:

1. In the process for the preparation of isoprene by reacting isobutene with aqueous formaldehyde in the presence of a catalyst to form 4,4-dimethyl-m-dioxane, in which the reaction mixture produced includes a hydrocarbon phase containing said dioxane and residual unreacted $C_4$ hydrocarbons as well as an aqueous phase containing glycol-type by-products constituting by-products less volatile than water and by-products more volatile than water, and decomposing catalytically said dioxane in the presence of steam into isoprene, the improvement for increasing the yield of isoprene which comprises concentrating said aqueous phase to remove at least a part of the water present and by-products more volatile than water, and decomposing catalytically into isoprene said by-products less volatile than water remaining after said concentrating.

2. Improvement according to claim 1 wherein said concentrating is carried out by evaporation of said water until the water content of said aqueous phase is about 5–50%.

3. Improvement according to claim 2 wherein said evaporation is carried out at least in part under reduced pressure.

4. Improvement according to claim 3 wherein said evaporation is carried out in several stages at progressively decreasing pressures.

5. Improvement according to claim 1 wherein before said concentrating the readily volatile substances contained in said aqueous phase are recovered by distillation, substantially without attendant removal of water, and recycled to the reaction of isobutene and formaldehyde.

6. Improvement according to claim 1 wherein before said concentrating the readily volatile substances contained in said aqueous phase are recovered by extraction with a solvent which is insoluble in said aqueous phase.

7. Improvement according to claim 6 wherein said extraction is carried out with starting isobutene-containing $C_4$ hydrocarbons as such solvent insoluble in said aqueous phase, and thereafter the so-loaded $C_4$ hydrocarbons are introduced into the reaction of isobutene and formaldehyde.

8. Improvement according to claim 1 wherein the water and volatile organic products obtained by said concentrating are extracted with starting isobutene-containing $C_4$ hydrocarbons, and thereafter the so-loaded $C_4$ hydrocarbons are introduced into the reaction of isobutene and formaldehyde.

9. Improvement according to claim 1 wherein the water and the volatile organic products obtained by said concentrating are used directly in a place of steam for the catalytic decomposition of said dioxane.

10. Improvement according to claim 1 wherein the decomposing catalytically into isoprene of said by-products less volatile than water is carried out together with the catalytic decomposing of said dioxane.

11. Improvement according to claim 1 wherein the decomposing catalytically into isoprene of said by-products less volatile than water is carried out in a fluidized bed in the presence of a phosphoric acid-containing catalyst.

12. Improvement according to claim 1 wherein the reaction of isobutene with aqueous formaldehyde is carried out in liquid phase in the presence of a sulfonic acid group-containing ion exchanger, the resulting hydrocarbon phase is separated from the resulting aqueous phase and catalyst, and said aqueous phase separated from said catalyst prior to said concentrating.

References Cited

UNITED STATES PATENTS 3,377,405   4/1968   Hurley et al. _____ 260—681

DELBERT E. GANTZ, Primary Examiner

G. E. SCHMITKONS, Assistant Examiner